(12) United States Patent
Hatwar et al.

(10) Patent No.: US 11,712,844 B2
(45) Date of Patent: Aug. 1, 2023

(54) LIGHTWEIGHT STRUCTURES HAVING INCREASED STRUCTURAL INTEGRITY AND AN ULTRA-LOW COEFFICIENT OF THERMAL EXPANSION

(71) Applicant: Eagle Technology, LLC, Melbourne, FL (US)

(72) Inventors: Tukaram K. Hatwar, Penfield, NY (US); Rebecca Borrelli, Rochester, NY (US); Steve Oliver, Webster, NY (US)

(73) Assignee: Eagle Technology, LLC, Melbourne, FL (US)

( * ) Notice: Subject to any disclaimer, the term of this patent is extended or adjusted under 35 U.S.C. 154(b) by 262 days.

(21) Appl. No.: 16/910,577

(22) Filed: Jun. 24, 2020

(65) Prior Publication Data
US 2021/0402683 A1    Dec. 30, 2021

(51) Int. Cl.
*B29C 64/165* (2017.01)
*B29C 64/314* (2017.01)
(Continued)

(52) U.S. Cl.
CPC .......... *B29C 64/165* (2017.08); *B22F 3/1035* (2013.01); *B29C 64/314* (2017.08); *B33Y 10/00* (2014.12); *B33Y 80/00* (2014.12)

(58) Field of Classification Search
CPC ... B29C 64/165; B29C 64/314; B22F 3/1035; B33Y 10/00; B33Y 80/00; B33Y 40/10; B33Y 40/20; B33Y 70/10; C04B 2235/441; C04B 35/14; C04B 35/624; C04B 2235/3418; C04B 2235/528; C04B 2235/5436; C04B 2235/5445; C04B 2235/5463; C04B 2235/5472;
(Continued)

(56) References Cited

U.S. PATENT DOCUMENTS 4,297,309 A * 10/1981 North .................. B22C 3/00
                                                                264/335
5,204,055 A    4/1993 Sachs et al.
(Continued)

OTHER PUBLICATIONS

Delmotte, C., et al., "Direct Ceramic Inkjet Printing for Multi-Material Components" https://www.researchgate.net/publication/266887337, pp. 632-636 (2015).
(Continued)

*Primary Examiner* — Nahida Sultana
(74) *Attorney, Agent, or Firm* — Edell, Shapiro & Finnan, LLC

(57) ABSTRACT

The present invention is directed toward an additive manufacturing method for manufacturing silica-based structures that have a low linear cure shrinkage percentage and an ultra-low coefficient of thermal expansion. The structure may be constructed with a powder mixture that contains at least a first set of silica-based particles that are spherical and that have a first size, and a second set of submicron silica-based particles that are jagged, spherical, or both jagged and spherical. The silica-based powder mixture may be combined with a surfactant in order to create a slurry that can be used to create a 3D printed structure that has a low linear cure shrinkage percentage and an ultra-low coefficient of thermal expansion.

10 Claims, 12 Drawing Sheets

(51) Int. Cl.
*B22F 3/10* (2006.01)
*B33Y 80/00* (2015.01)
*B33Y 10/00* (2015.01)

(58) Field of Classification Search
CPC ...... C04B 2235/6026; C04B 2235/616; C04B 2235/9607
See application file for complete search history.

(56) References Cited

U.S. PATENT DOCUMENTS

| | | | |
|---|---|---|---|
| 5,409,870 A * | 4/1995 | Locker | B01J 21/14 501/153 |
| 6,471,800 B2 | 10/2002 | Jang et al. | |
| 8,142,860 B2 | 3/2012 | Vanmaele et al. | |
| 10,145,991 B2 | 12/2018 | Mooney et al. | |
| 11,007,710 B2 * | 5/2021 | Abbott, Jr. | B22F 10/28 |
| 2007/0261378 A1 * | 11/2007 | Miao | B01D 46/24494 55/523 |
| 2011/0160104 A1 * | 6/2011 | Wu | C04B 35/195 507/269 |
| 2015/0056415 A1 | 2/2015 | Southard | |
| 2016/0257033 A1 * | 9/2016 | Jayanti | B33Y 80/00 |
| 2022/0111585 A1 * | 4/2022 | Hirschsohn | B33Y 70/00 |

OTHER PUBLICATIONS

Destino, J. F., et al. "3D Printed Optical Quality Silica and Silica-Titania Glasses from Sol-Gel Feedstocks", Adv. Mater. Technol., 3, 1700323 (pp. 1-10) (2018).

Herzog, H., et al., "Optical Fabrication of Lightweighted 3D Printed Mirrors", Proc. SPIE vol. 9573, pp. 957308-1-957308-15 (2015).

Marchelli, G., et al., "The Guide to Glass 3D Printing: Developments, Methods, Diagnostics and Results", Rapid Prototyping J., vol. 17, Issue 3, pp. 187-194 (2011).

Mici, J., et al., "Optomechanical Performance of 3D-Printed Mirrors with Embedded Cooling Channels and Substructures", Proc. SPIE vol. 9573, pp. 957306-1-957306-14 (2015).

Nguyen, D. T., et al., "3D-Printed Transparent Glass", Adv. Mater. vol. 29, pp. 1701181-1-1701181-5 (2017).

Sweeny, M., et al., "Application and Testing of Additive Manufacturing for Mirrors and Precision Structures", Proc. SPIE, vol. 9574, pp. 957406-1-957406-13 (2015).

Utela, B., et al., "Advanced Ceramic Materials and Processes for Three-Dimensional Printing (3DP)", 2006 International Solid Freeform Fabrication Symposium, pp. 290-303 (2006).

* cited by examiner

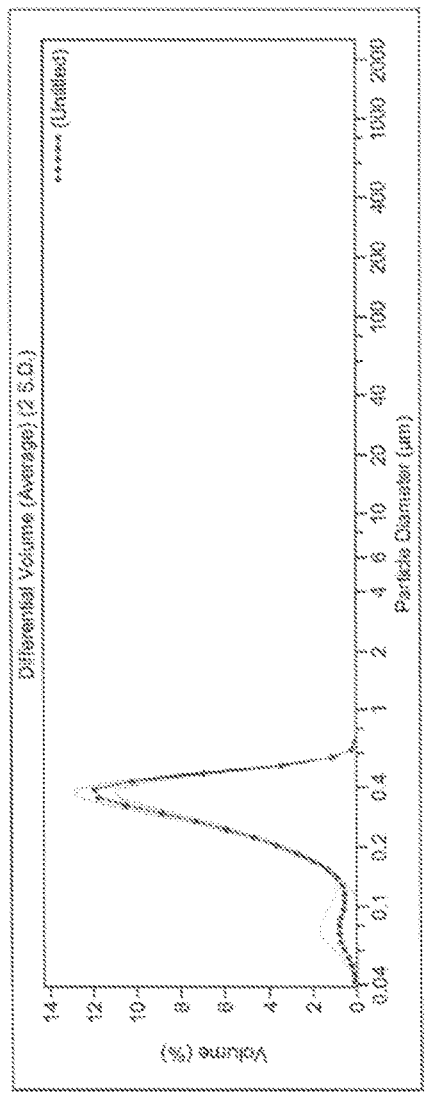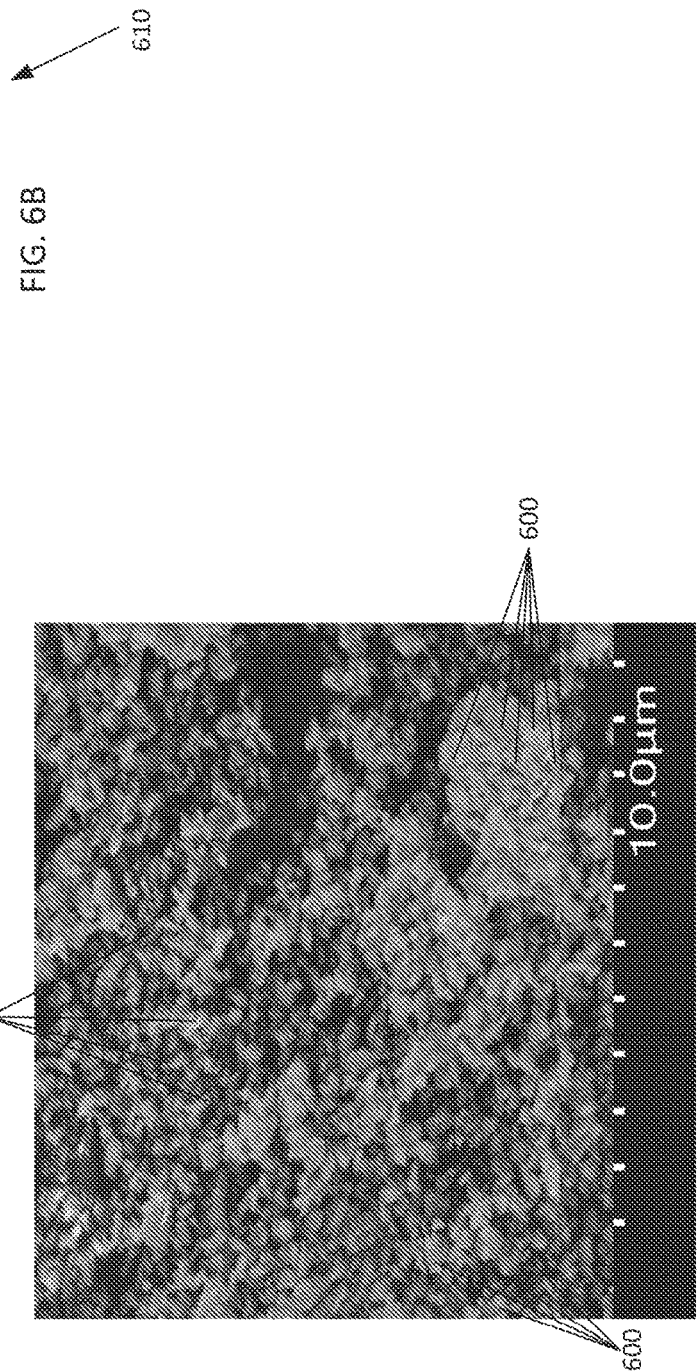
FIG. 6B
FIG. 6A

| Example # | Powder | Solvent | Fill Factor (vol%) |
|---|---|---|---|
| Structure 1 | First set of spherical silica-based particles 400 : Second set of spherical silica-based particles 500 (33:66) | H2O | 66.1 |
| Structure 2 | First set of spherical silica-based particles 400 : Second set of spherical silica-based particles 500 (50:50) | H2O | 68.1 |
| Structure 3 | First set of spherical silica-based particles 400 : Second set of spherical silica-based particles 500 (66:33) | H2O | 67.8 |
| Structure 4 | First set of spherical silica-based particles 400 : Second set of spherical silica-based particles 500 (50:50) Third set of submicron silica-based particles 600 = 2.5% | H2O | 71.1 |
| Structure 5 | First set of spherical silica-based particles 400 : Second set of spherical silica-based particles 500 (50:50) Third set of submicron silica-based particles 600 = 5.0% | H2O | 72.1 |
| Structure 6 | First set of spherical silica-based particles 400 : Second set of spherical silica-based particles 500 (50:50) Third set of submicron silica-based particles 600 = 7.5% | H2O | 73.1 |
| Structure 7 | First set of spherical silica-based particles 400 : Second set of spherical silica-based particles 500 (50:50) Third set of submicron silica-based particles 600 = 10.2% | H2O | 73.4 |
| Structure 8 | First set of spherical silica-based particles 400 : Second set of spherical silica-based particles 500 (50:50) Third set of submicron silica-based particles 600 = 15.0% | H2O | 74.1 |
| Structure 9 | First set of spherical silica-based particles 400 : Second set of spherical silica-based particles 500 (50:50) Third set of submicron silica-based particles 600 = 20.0% | H2O | 77.5 |
| Structure 10 | First set of spherical silica-based particles 400 : Second set of spherical silica-based particles 500 (62:38) Third set of submicron silica-based particles 600 = 20.0% | H2O | 77.7 |

FIG. 7

LIGHTWEIGHT STRUCTURES HAVING INCREASED STRUCTURAL INTEGRITY AND AN ULTRA-LOW COEFFICIENT OF THERMAL EXPANSION

GOVERNMENT LICENSE RIGHTS

This invention was made with the support of the U.S. Government, and the U.S. Government has certain rights in the invention.

BACKGROUND OF THE INVENTION

Lightweight structures are critical components in ground-based, airborne, and space-based applications. It is essential that lightweight structures intended for use in space-based applications have a low or ultra-low coefficient of thermal expansion. Low or ultra-low thermal expansion structures are structures that contain a coefficient of thermal expansion (hereinafter "CTE") that is of a value at or near zero. CTE represents the degree at which an object expands with respect to a change in temperature. Typical structures or materials expand or contract depending on changes in temperature. Thus, these typical structures or materials have a CTE value significantly above zero. Structures or materials that have CTE value at or near zero, however, minimally expand or contract when experiencing changes in temperature, even when experiencing extreme changes in temperature.

Lightweight structures having a low CTE or ultra-low CTE are often utilized in the space and aerospace markets, commercial imaging systems, telescopes, optical benches, and antenna structures because they are insensitive to temperature changes. Traditional low or ultra-low CTE structures are made using subtractive manufacturing (e.g., abrasive waterjet cutting process, precisions machining, etc.), which require lengthy cycle times, high costs, and result in a large amount of wasted materials. Silica-based materials are common materials used to construct traditional lightweight structures having a low or ultra-low CTE with traditional subtractive manufacturing.

While attempts have been made to produce the low or ultra-low CTE structures via additive manufacturing processes, these attempts are limited to applications that tolerate high cure shrinkage during the additive manufacturing process and/or result in heavy structures. These previous additive manufacturing attempts, moreover, typically leverage materials that are tolerant of high cure shrinkage, but are not applicable or sufficient for stable lightweight ultra-low CTE structures (i.e., they do not possess a low enough CTE). For example, to date, using silica-based materials/powders to additively manufacture lightweight structures has typically lead to cracking of the structure during a high temperature sintering process because structures additively manufactured with the silica-based powder are susceptible to large cure shrinkage. Furthermore, three-dimensional printed parts manufactured using silica-based powders have a low green strength when in their green state (i.e., prior to curing and sintering of the printed parts), which makes the printed parts difficult to handle for further processing (i.e., sintering, finishing, etc.). Despite desired material properties of the silica-based materials, there has been an inability to manufacture large and lightweight ultra-low CTE structures using both an additive manufacturing process and silica-based materials/powders.

Accordingly, it would be desirable to be able to additively manufacture a low or ultra-low CTE or near zero CTE structure with silica-based materials/powders so that the resulting structure has the same or similar properties to the silica-based structures that are manufactured using traditional subtractive manufacturing processes. Additive manufacturing has proven to be lower in cost and shorter in cycle or lead time to manufacture complex structures when compared to typical subtractive manufacturing processes. More specifically, it would be desirable to additively manufacture a lightweight structure having a low or ultra-low CTE using silica-based powders.

SUMMARY OF THE INVENTION

The present invention is directed toward an additive manufacturing method for manufacturing silica-based structures that have a low linear cure shrinkage percentage and an ultra-low coefficient of thermal expansion or CTE. The structure may be constructed with a powder mixture that contains at least a first set of silica-based particles that are spherical and that have a first size, and a second set of submicron silica-based particles that are jagged, spherical, or both jagged and spherical. The silica-based powder mixture may be combined with a surfactant in order to create a slurry that can be used to create a 3D printed structure that has a low linear cure shrinkage percentage and an ultra-low CTE. In some embodiments, the slurry may be a water-based slurry (i.e., the slurry contents include at least the silica-based powder mixture, water, and the surfactant) or may be a resin-based slurry (i.e., the slurry contents include at least the silica-based powder mixture, a UV curable resin, and the surfactant)

In one embodiment, the present invention is directed to a method of manufacturing a structure with an ultra-low CTE. The method includes acquiring a powder that is made up of spherical particles, and then mixing the powder with a surfactant to formulate a slurry. The method further includes using additive manufacturing techniques (e.g., three-dimensional printing (hereinafter "3D printing")) to manufacture a processed part with the slurry, and then sintering the processed part to form the structure.

Furthermore, the spherical particles of the powder range in size from approximately 1 micrometer to approximately 60 micrometers. In addition, when mixing the powder with the surfactant to formulate the slurry, the powder may be mixed with both a surfactant and a set of submicron particles, where the submicron particles may be of any shape. The submicron particles may also range in size from approximately 0.05 micrometers to approximately 1 micrometer. According to this embodiment of the method, the spherical particles and the submicron particles may both be silica-based materials. The method may further comprise, prior to sintering the processed part, performing a dry out process of the processed part, and performing a sol-gel infiltration process on the processed part.

In another embodiment, the present invention is directed to a method of manufacturing a structure with an ultra-low CTE, where the method includes acquiring a powder made up of a first set of particles and a second set of particles. The first set of particles may be spherical and may be of first size, while the second set of particles may be any shape, and may be of a second size. The second size of the second set of particles may be smaller than the first size of the first set of particles. The method may further include mixing the powder with a surfactant to formulate a slurry, and then performing an additive manufacturing process with the slurry to form a processed part. The method may also include sintering the processed part to form the structure.

In accordance with this embodiment of the present invention, the first set of particles may range in size from approximately 1 micrometer to approximately 60 micrometers, while the second set of particles may be submicron particles that range in size from approximately 0.05 micrometers to approximately 1 micrometer. The structure manufactured with this embodiment of the method may have a CTE less than or equal to 0.03 parts per million per ° C. The structure may also have a pre-sintering fill factor of at least 67%, and a post-sintering linear cure shrinkage of less than 10% from the processed part.

In yet another embodiment, the present invention is directed to a three dimensional printed structure that is made up of a first set of silica-based particles that are spherical and that have a first size, and a second set of silica-based particles that are of any shape, and that have a second size that is smaller than the first size. The three dimensional printed structure may have a CTE less than or equal to 0.03 parts per million per ° C. In addition, the first set of particles may range in size from approximately 1 micrometer to approximately 60 micrometers, while having a density distribution of D50 equal to approximately 12 micrometers to approximately 25 micrometers. The second set of particles may be submicron particles that range in size from approximately 0.05 micrometers to approximately 1 micrometer, while having a density distribution of D50 equal to approximately 0.1 micrometers to approximately 0.35 micrometers. The three dimensional printed structure may have a pre-sintering fill factor of at least 67%, and a post-sintering linear cure shrinkage of less than 10%.

BRIEF DESCRIPTION OF THE DRAWINGS

FIG. 6A illustrates an optical photomicrograph of a third set of powder particles used to formulate an ultra-low CTE structure in accordance with the process illustrated in FIG. 3, and in accordance with the aspects of the present invention.

FIG. 6B illustrates an graph of the particle size distribution of the third set of powder particles illustrated in FIG. 6A in accordance with the aspects of the present invention.

FIG. 7 illustrates a chart of depicting the fill factor percentage of various structures based on various ratios and percentages of the first set of powder particles, the second set of powder particles, and third set of powder particles in accordance with the aspects of the present invention.

Like reference numerals have been used to identify like elements throughout this disclosure.

DETAILED DESCRIPTION OF THE INVENTION

The present invention relates to additively manufactured lightweight structures, and particularly silica-based structures, that are less prone to post-sintering linear cure shrinkage, and that have a low or ultra-low coefficient of thermal expansion or CTE. The present invention also relates to a process for additively manufacturing these lightweight silica-based structures.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Figure 1A:
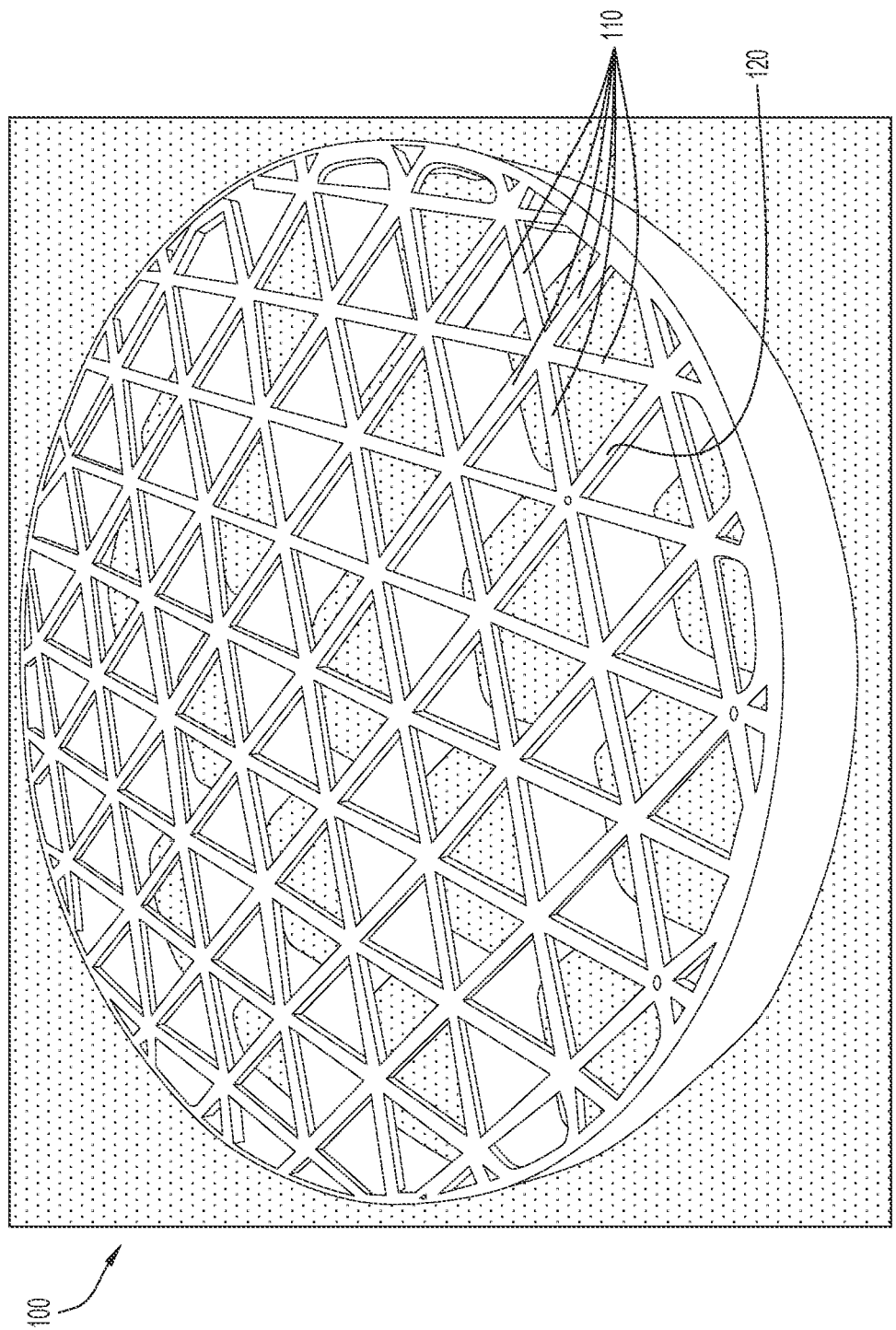
FIG. 1A illustrates a top perspective view of an example embodiment of additively manufactured ultra-low CTE structure manufactured in accordance with the aspects of the present invention.
Figure 1B:
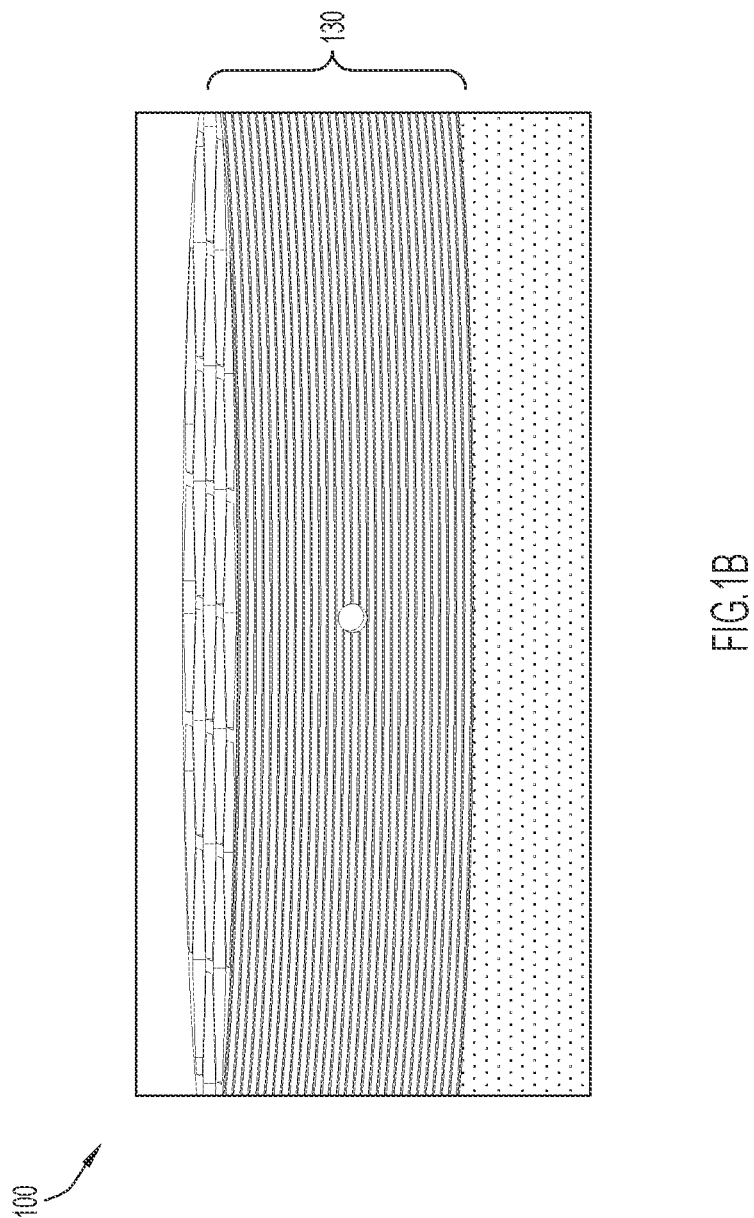
FIG. 1B illustrates a side view of the additively manufactured ultra-low CTE structure illustrated in FIG. 1A, and in accordance with the aspects of the present invention.
Figure 1C:
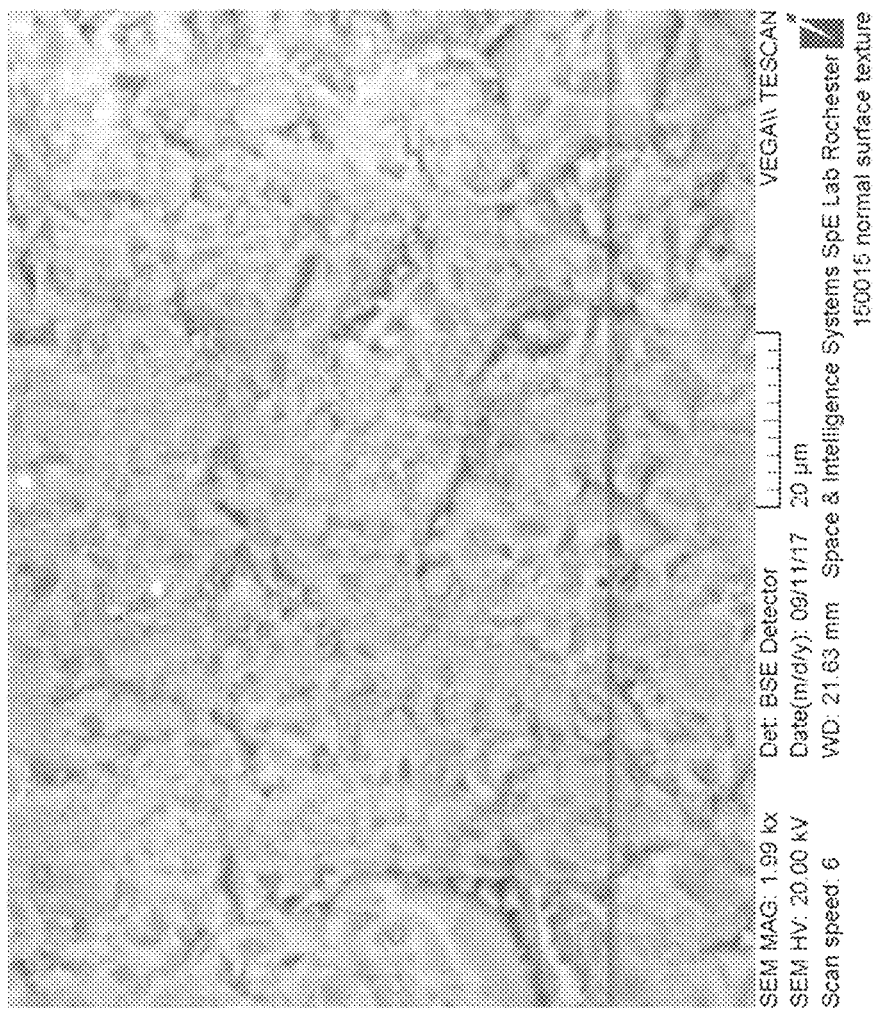
FIG. 1C illustrates an optical photomicrograph the surface of the additively manufactured ultra-low CTE structure illustrated in FIG. 1A, and in accordance with the aspects of the present invention.
Figure 2:
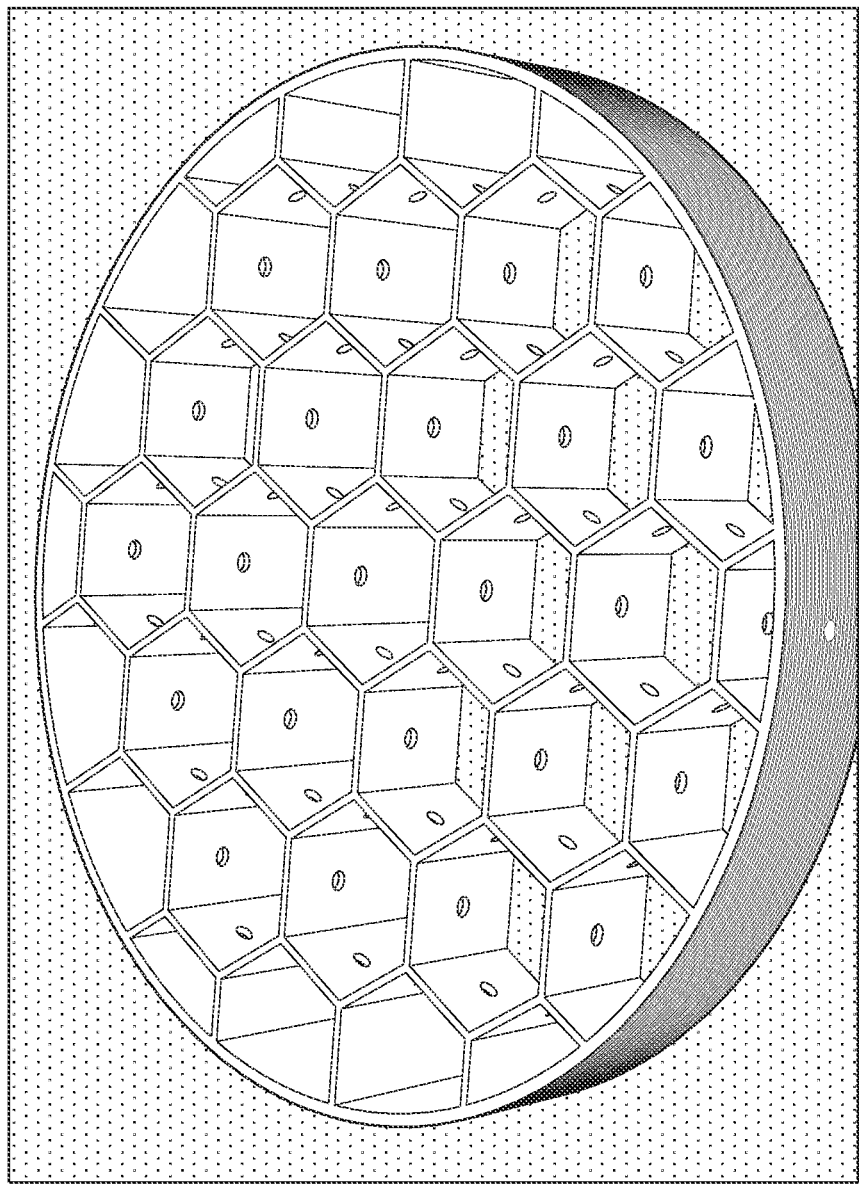
FIG. 2 illustrates a top perspective view of another embodiment of an additively manufactured ultra-low CTE structure manufactured in accordance with the aspects of the present invention.

FIGS. 1A, 1B, 1C, and 2 illustrate example embodiments of complex low or ultra-low CTE structures that may be additively manufactured using the method described herein. FIGS. 1A, 1B, and 1C illustrate the complex low or ultra-low CTE structure 100, which is a cathedral structure. FIG. 2 illustrates the complex low or ultra-low CTE structure 200, which is a honeycomb structure. The complex low or ultra-low CTE structures 100, 200, once additively manufactured, may be combined with or coupled to (e.g., adhesives, bonding, etc.) other structures. Other examples of low or ultra-low CTE structures that may be manufactured using the method described herein are those structures described with reference to U.S. Pat. Nos. 10,422,933 and 10,145,991.

As further detailed below, the complex low or ultra-low CTE structures 100, 200 may be manufactured via an additive manufacturing processes, such as, but not limited to, 3D printing or binder jetting, directed energy deposition, material extrusion, powder bed fusion, sheet lamination, vat polymerization, wire arc additive manufacturing, etc. In one embodiment, the complex low or ultra-low CTE structures 100, 200 may be manufactured via 3D printing techniques as disclosed herein. 3D printing is an additive manufacturing process in which a plurality of layers of a material are successively deposited atop one another to create a physical object. Suitable materials for additively manufacturing the complex low or ultra-low CTE structures 100, 200 include one or more silica-based materials having a low or ultra-low CTE. The silica-based materials include, but are not limited to, one or a combination of a silicon carbide material, a ceramic material, fused silica, a ceramic-doped polymeric material, a glass-ceramic material, an ultra-low expansion glass material, a carbon nanotube-filled polymeric material, and a carbon composite material. Silica-based materials may be resistant to thermal shock and may possess a CTE of about 0.00±0.03 ppm per ° C. at 5-35° C. As used herein, the terms "low or ultra-low CTE," low or ultra-low expansion," "ultra-low CTE," and "ultra-low expansion" means a material or structure having a CTE of approximately 0.00±0.03 ppm per ° C. in a range of 5-35° C.

Figure 3:
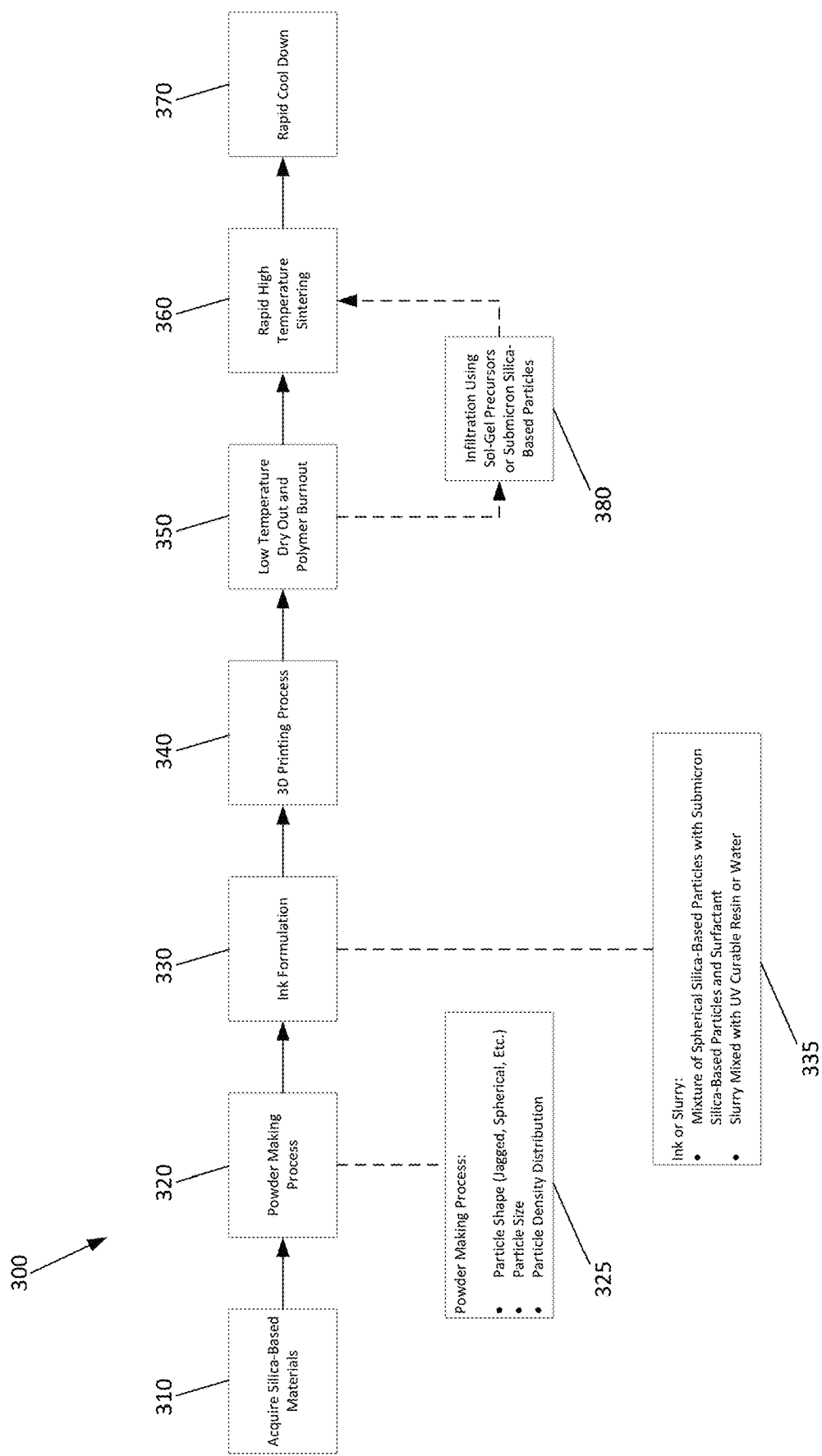
FIG. 3 illustrates a flowchart of the process for additively manufacturing the ultra-low CTE structures illustrated in FIGS. 1A and 2, and in accordance with the aspects of the present invention.

Turning to FIG. 3, illustrated is a process or method 300 for additively manufacturing a structure, such as the complex low or ultra-low CTE structures 100, 200, via a 3D printing process. 3D printing the complex low or ultra-low CTE structures 100, 200 enable the size/volume of the structures 100, 200 to be optimized such that their stiffness is maximized while their weight or mass is minimized. For example, 3D printing enables the fabrication of the complex low or ultra-low CTE structures 100, 200 with any desired structure including, but not limited to, a honeycomb structure (as best shown in FIG. 2), a truss structure, a free form continuous structure, or a cathedral structure (as best shown in FIG. 1A). One of ordinary skill in the art will understand, upon reading this disclosure that other low or ultra-low CTE structures are achievable using the inventive methods described herein. Furthermore, 3D printing further reduces the schedule and cost for manufacturing the structures having complex shapes, especially when compared to traditional subtractive manufacturing techniques. At 310, a silica-based material is acquired. As previously explained, the silica-based materials may include, but are not limited to, one or a combination of a silicon carbide material, a ceramic material, fused silica, a ceramic-doped polymeric material, a glass-ceramic material, an ultra-low expansion glass material, a carbon nanotube-filled polymeric material, and a carbon composite material. Silica-based materials provide the desired materials properties for the low or ultra-low CTE structures 100, 200 because they have the desired physical properties (i.e., ultra-low CTE).

At 320, the acquired silica-based material is made into a powder. Large silica-based pieces can be fractured into smaller pieces, milled into granules, and sorted to obtain a certain powder particle size, a certain powder particle density distribution, and a certain powder particle shape distribution (as indicated in 325). As further detailed below, obtaining the desired powder particle size, shape, and distribution allows for a higher pre-sintering density, and a lower cure shrinkage, while still resulting in a low or ultra-low CTE of the final manufactured structure. Once the desired powder particles have been made and sorted, at 330, an ink or slurry is formulated with the selected powder particles. As indicated at 335, the slurry is formulated by mixing the selected silica-based particles of step 320 with at least submicron silica-based particles and a surfactant. The submicron silica-based particles may be the same silica-based material as the silica-based powder particles selected at step 320, may be a variant of the silica-based powder particles selected at step 320, or may be a different silica-based material from that of the silica-based powder particles selected at step 320. In one embodiment, the slurry may be further mixed with a polymer to create a polymer-based slurry. The polymer of the polymer-based slurry may include, but is not limited to, an ultraviolet (hereinafter "UV") curable resin or UV cure binder. The polymer (e.g., the UV cure binder) being mixed into the slurry enables the handling of the printed structure in the green state without the printed structure being damaged, as explained below. In another embodiment, the slurry may be further mixed with water, instead of resin, to formulate a water-based slurry.

At 340, the structure may be formulated using a 3D printing process. Thus, at 340, the slurry of 330 and 335 is used in a 3D printing process to print, in a plurality of layers, the desired shape, configuration, and orientation of the complex structures 100, 200. In the embodiment where the slurry includes the UV cure binder, each printed layer may be cured with a UV light before depositing the next layer atop the printed layer. When creating the 3D printed structure with a slurry having a UV cure binder, subjecting each layer of the 3D printed structure to the UV light ultimately may create a relatively high green strength for the final 3D printed structure, which facilitates handling and further processing of the 3D printed structure without the 3D printed structure breaking or becoming damaged. With a printed structure in a green state, at 350, a low temperature dry out and polymer burnout of the printed structure is performed. The printed structure in the green state may be subjected to a predetermined temperature for a predetermined time. This predetermined temperature may be lower compared to the temperature(s) of the sintering phase. For example, the printed structure in the green state may be subjected to a low temperature dry out and polymer burnout process at a temperature of approximately 200° C. for one or more hours.

At 360, the printed structure is then subjected to a rapid high temperature sintering process and then, at 370, a rapid cool down. The rapid high temperature sintering process 360 may subject the printed structure to various temperatures (i.e., ranging between approximately 600° C. to approximately 1,600° C.) for various amounts of time (i.e., ranging from approximately 1 minute to approximately 6 hours or more). In some embodiments, the rapid high temperature sintering process may contain multiple steps, where each phase subjects the printed structure to a predetermined temperature (i.e., some temperature between approximately 600° C. to approximately 1,600° C.) for a predetermined time period (i.e., some time period between approximately 1 minute to approximately 6+ hours). In some embodiments, the rapid high temperature sintering process may contain multiple steps, and may include rapid ramp up and ramp down rates between each step of the rapid high temperature sintering process. The rapid cool down process, moreover, may include rapid ramp down rates to quickly cool the printed structure from the relatively high sintering temperatures (i.e., high temperatures compared to the dry out process temperatures and the final cool down temperature) to approximately slightly above room temperature.

In some embodiments of the additive manufacturing method 300, after the dry out and polymer burnout process 350, but prior to the rapid high temperature sintering process 360, the printed structure may be subjected to, at 380, at least one infiltration process using sol-gel precursors or submicron silica-based particles. As explained in further detail below, the infiltration process 380 is an optional step that may be performed when additively manufacturing structures with the method 300. The infiltration process 380 is designed to introduce or infiltrate more submicron particles or material into the voids or interstitial spaces between the powder particles of the 3D printed structures when in the green state to increase their pre-sintering density, minimize their post-sintering cure shrinkage, and increase the strength of the 3D printed parts. Furthermore, the infiltration process 380 may be performed any number of times prior to performing the sintering process 360.

As previously explained with regard to the powder making process 320 of the additive manufacturing method 300, the silica-based material acquired in step 310 is formulated into a powder where the powder is sorted to obtaining the desired powder particle size, shape, and distribution allows for a higher loading density in the printing slurry, and a lower post-sintering cure shrinkage. Turning to FIGS. 4A, 4B, 5A, 5B, 6A, and 6B, illustrated are the various powder particles that makeup one or more embodiments of desired powder mixture used to form a slurry in accordance with the additive manufacturing method 300. Substantially spherical silica-based particles having a certain size, shape, and density distribution to enable the printing slurry to have a higher loading density, while also enabling the 3D printed structure to have a lower cure shrinkage during the sintering process. For example, substantially spherical silica-based powders that have a particle size ranging between approximately 1.00 µm and approximately 60.00 µm (i.e., that are micron particles), and that have a density distribution of D50=approximately 12.00 µm-approximately 25.00 µm may have an increased powder loading density (approximately 68% or more) compared to powders made with jagged or irregular shaped powder particles (density of approximately 50%). The terms "substantially spherical" and "spherical" as used herein to describe the shape of the powder particles refers to the powder particles having a substantially rounded shape. The terms "substantially spherical" and "spherical" are not intended to limit the shape of the particles to perfect spheres. Thus, when describing the shape of the powder particles as "spherical" or "substantially spherical," the powder particles may be of any rounded three-dimensional shape, including, but not limited to, spheres, spheroids, ellipsoids, oviods, substantially spheroidal shapes (i.e., with surface imperfections), substantially ellipsoidal shapes (i.e., with surface imperfections), substantially oviodal shapes (i.e., with surface imperfections), etc.

In addition, by adding a set of submicron silica-based particles to the powder mixture, where the submicron silica-based particles range in size of approximately 0.05 µm to approximately 1.00 µm, and where the submicron silica-based particles have a density distribution D50=approximately 0.10 µm-approximately 0.35 µm, the powder loading density may further increase to approximately 77.7%, and the post-sintering cure shrinkage may be below 10%. By adding the submicron silica-based particles to the powder mixture, the intra-particle spaces, intra-particle voids, or interstitial spaces between the spherical silica-based particles may be filled with the submicron silica-based particles. Furthermore, while the silica-based particles may be substantially spherical, the submicron silica-based particles may be jagged, spherical, both jagged and spherical, or any other shape.

Figure 4B:
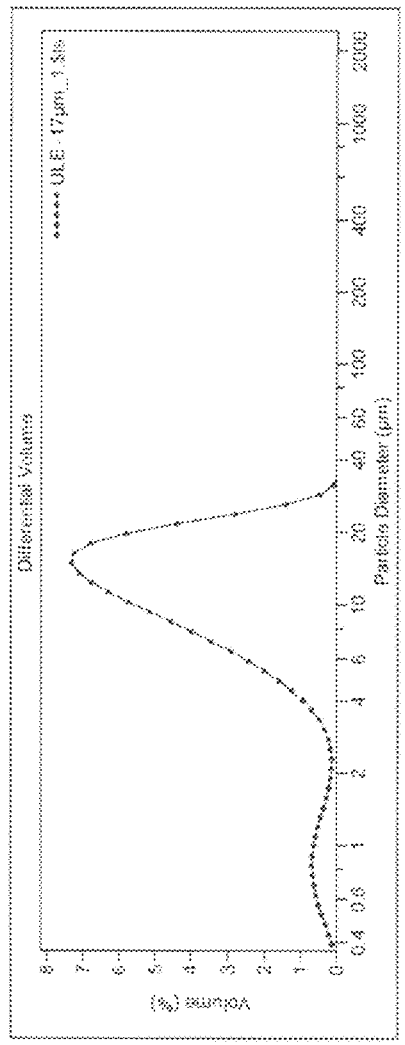
FIG. 4B illustrates an graph of the particle size distribution of the first set of powder particles illustrated in FIG. 4A in accordance with the aspects of the present invention.
Figure 4A:
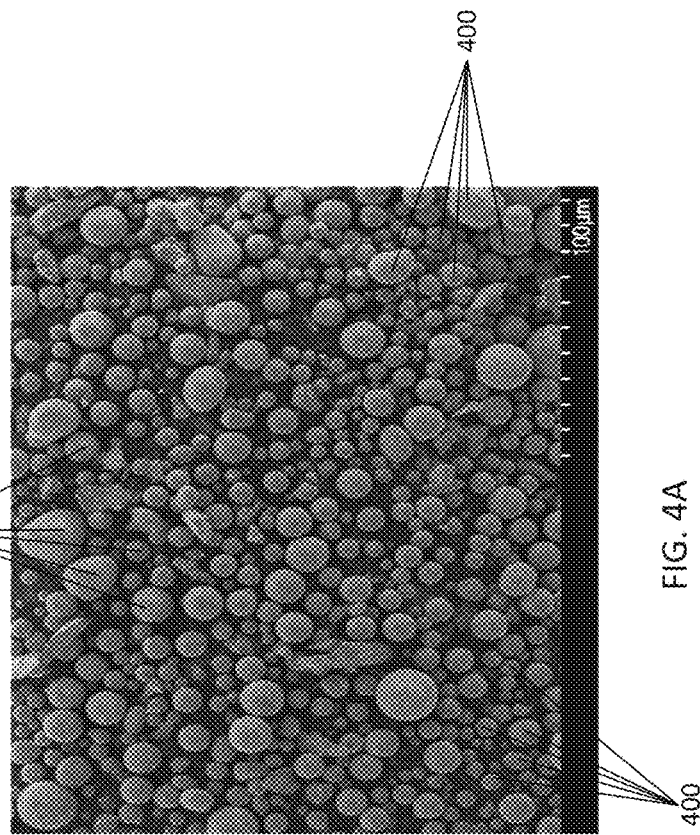
FIG. 4A illustrates an optical photomicrograph of a first set of powder particles used to formulate an ultra-low CTE structure in accordance with the process illustrated in FIG. 3, and in accordance with the aspects of the present invention.
Figure 5B:
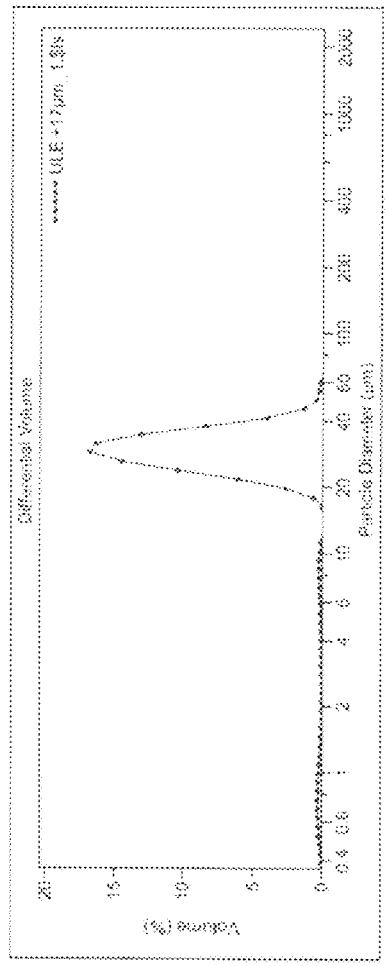
FIG. 5B illustrates an graph of the particle size distribution of the second set of powder particles illustrated in FIG. 5A in accordance with the aspects of the present invention.

In one embodiment, a desired silica-based powder used in the slurry in accordance with the additive manufacturing method 300, and in accordance to acquire a ultra-low CTE structure that has a linear cure shrinkage of less than 10%, may be made up of three different sets of silica-based particles. FIGS. 4A and 4B illustrate a first set of silica-based particles 400, FIGS. 5A and 5B illustrate a second set of silica-based particles 500, and FIGS. 6A and 6B illustrate a third set of silica-based particles 600, where the powder mixture used to formulate the slurry of step 330 of the additive manufacturing method 300 includes a certain percentage of each of the three sets of silica-based particles.

The first set of silica-based particles 400, as illustrated in FIG. 4A, are substantially spherical in shape. As previously explained, the terms "substantially spherical" and "spherical" as used herein to describe the shape of the first set of silica-based particles refers to the particles having a substantially rounded three-dimensional shape. The terms "substantially spherical" and "spherical" are not intended to limit the shape of the first set of silica-based particles to perfect spheres. Thus, when describing the shape of the first set of silica-based particle as "spherical" or "substantially spherical," the first set of silica-based particles may be of any rounded three-dimensional shape, including, but not limited to, spheres, spheroids, ellipsoids, oviods, substantially spheroidal shapes (i.e., with surface imperfections), substantially ellipsoidal shapes (i.e., with surface imperfections), substantially oviodal shapes (i.e., with surface imperfections), etc. Moreover, the majority of the particles of the first set of silica-based particles 400 may be substantially spherical in shape (e.g., more than 50% of the particles, preferably more than 75% of the particles, and even more preferably more than 90% of the particles), but may include a small number of particles that are not substantially spherical in shape (e.g., less than 50% of the particles, preferable less than 25% of the particles, and even more preferable less than 10% of the particles). As further illustrated in the distribution chart 410 of FIG. 4B, the first set of silica-based particles 400 may be micron particles that range in size from approximately 30.00 µm in diameter to approximately 0.40 µm in diameter, with the majority of the particles 400 ranging between approximately 3.00 µm to approximately 30.00 µm. Thus, the size of each particle of the first set of silica-based particles 400 is the diameter of that particle. Furthermore, the average diameter, or mean diameter, of the first set of silica-based particles 400 may be approximately 11.84 µm.

Figure 5A:
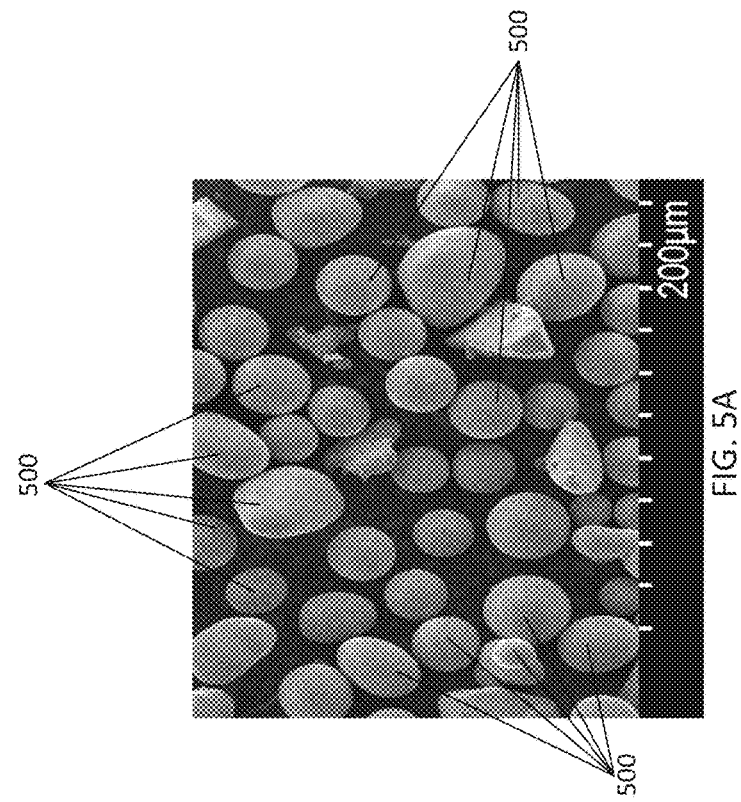
FIG. 5A illustrates an optical photomicrograph of a second set of powder particles used to formulate an ultra-low CTE structure in accordance with the process illustrated in FIG. 3, and in accordance with the aspects of the present invention.

Like the first set of silica-based particles 400, the second set of silica-based particles 500, as illustrated in FIG. 5A, are also substantially spherical in shape. As previously explained, the terms "substantially spherical" and "spherical" as used herein to describe the shape of the second set of silica-based particles refers to the particles having a substantially rounded three-dimensional shape. The terms "substantially spherical" and "spherical" are not intended to limit the shape of the second set of silica-based particles to perfect spheres. Thus, when describing the shape of the second set of silica-based particle as "spherical" or "substantially spherical," the second set of silica-based particles may be of any rounded three-dimensional shape, including, but not limited to, spheres, spheroids, ellipsoids, oviods, substantially spheroidal shapes (i.e., with surface imperfections), substantially ellipsoidal shapes (i.e., with surface imperfections), substantially oviodal shapes (i.e., with surface imperfections), etc. Moreover, the majority of the particles of the second set of silica-based particles 500 may be substantially spherical in shape (e.g., more than 50% of the particles, preferably more than 75% of the particles, and even more preferably more than 90% of the particles), but may include a small number of particles that are not substantially spherical in shape (e.g., less than 50% of the particles, preferable less than 25% of the particles, and even more preferable less than 10% of the particles). As further illustrated in the distribution chart 510 of FIG. 5B, the second set of silica-based particles 500 may be micron particles that range in size from approximately 60.60 µm in diameter to approximately 17.00 µm in diameter, with the majority of the second set of particles 500 ranging between approximately 19.00 µm to approximately 60.00 µm. Thus, the size of each particle of the second set of silica-based particles 500 is the diameter of that particle. Furthermore, the average diameter, or mean diameter, of the second set of silica-based particles 500 may be approximately 25.00 µm.

The third set of silica-based particles 600, as illustrated in FIG. 6A, are more jagged in shape than those of the first set of particles 400 and the second set of particles 500. While FIG. 6A shows the third set of silica-based particles 600 as jagged particles, the third set of silica-based particles 600 may be of any shape, jagged, spherical, both jagged and spherical, or any other mix of particle shapes. As further illustrated in the distribution chart 610 of FIG. 6B, the third set of silica-based particles 600 are submicron particles, and may range in size from approximately 0.50 µm to approximately 0.04 µm. The distribution chart 610 further illustrates that the majority of the third set of particles 600 range in size between approximately 0.50 µm to approximately 0.15 µm. Thus, the size of each particle of the third set of silica-based particles 600 is the largest linear dimension of that particle. Furthermore, the average size, or mean size, of the third set of submicron silica-based particles 600 may be approximately 0.30 µm.

Turning to FIG. 7, and with continued reference to FIGS. 4A, 4B, 5A, 5B, 6A, and 6B, illustrated is a chart 700 that shows how the fill factor percentage or powder loading density percentage of a 3D printed structure changes based on how the amounts of the various sets of silica-based particles 400, 500, 600 are adjusted. The fill factor of particles 400, 500, 600 may be adjusted such that the fill factor percentage of the 3D printed structure is at least approximately 68%. As previously explained, a fill factor percentage or powder loading density percentage of approximately 68% provides the desired linear cure shrinkage percentage (i.e., less than 10%) of the structure during the sintering process. While 68% provides desired characteristics of the 3D printed structure, increasing the fill factor percentage above 68% further improves the characteristics of the 3D printed structure by further decreasing the linear cure shrinkage percentage.

As shown in the chart 700 illustrated in FIG. 7, in example structures 1-3, the structures were created without using any of the third set of submicron particles 600 in the slurry, but were able to adjust the ratios of the first set of particles 400 to the second set of particles 500 to acquire a fill factor percentage of approximately 68%. The first example structure was created with a powder mixture having approximately 33% of the first set of silica-based particles 400 and approximately 66% of the second set of silica-based particles 500. The average particle diameter of this powder mixture is may be approximately 18.06 µm. This resulted in a fill factor percentage of approximately 68.1% for the first example structure. The second example structure was created with a powder mixture having approximately equal parts of the first set of silica-based particles 400 and the second set of silica-based particles 500 (i.e., approximately 50% the first set of silica-based particles 400 and approximately 50% the second set of silica-based particles 500). The average particle diameter of this powder mixture is may be approximately 16.51 µm. This also resulted in a fill factor percentage of approximately 68.1% for the second example structure. The third example structure was created with a powder mixture having approximately 66% of the first set of silica-based particles 400 and approximately 33% of the second set of silica-based particles 500. The average particle diameter of this powder mixture is may be approximately 14.95 µm. This resulted in a fill factor percentage of approximately 67.8% for the third example structure, which is only marginally less than the first and second example structures. In some instances, if only the first set of silica-based particles 400 (i.e., 100% first set of silica based particles 400) or only the second set of silica based particles (i.e., 100% second set of the silica based particles 500) were used in the powder mixture, then the fill factor percentage may be in the upper 50% range or the lower 60% range, and the 3D printed structure may not contain all of the desired structural features, and may be prone to cracking during the sintering process due to too large of a linear cure shrinkage percentage.

Additionally, as shown in the chart 700 illustrated in FIG. 7, example structures 4-10 were created using various percentages of the third set of submicron silica-based particles 600 in the powder mixture for the slurry. Furthermore, in each of example structures 4-9, the powder mixture may contain equal parts of the first set of silica-based particles 400 and the second set of silica-based particles 500 (i.e., 50% the first set of silica-based particles 400 and 50% the second set of silica-based particles 500). The percentage of the third set of submicron silica-based particles 600 added to the powder mixture increases from an additional 2.5% of the powder mixture to an additional 20.0% of the powder mixture from the fourth example structure to the ninth example structure. As the chart 700 further depicts, increasing the powder mixture by simply adding to the mixture an additional 2.5% of the third set of submicron silica-based particles 600 increases the fill factor percentage from approximately 68.1% to approximately 71.1%, or by 3.0% (i.e., comparing the second example structure to the fourth example structure). Furthermore, the chart 700 also depicts that as the amount of the third set of submicron silica-based particles 600 added to the powder mixture of equal parts of the first and second sets of silica-based particles 400, 500 is increased, the fill factor percentage increases from approximately 71.1% (the fourth example structure) to 77.5% (the ninth example structure). As further depicted in the chart 700, a maximum fill factor percentage (i.e., approximately 77.7%) may be achieved by optimizing the ratio of the first set of silica-based particles 400 to the second set of silica-based particles 500, while also optimizing the amount of the third set of submicron silica-based particles to add to the powder mixture. The chart 700 depicts, as the tenth example structure, that a maximum fill factor percentage may be achieved when the initial powder mixture is made up of 62% of the first set of silica-based particles 400 and 38% of the second set of silica-based particles 500, and then adding an additional 20% to the mixture of the third set of submicron silica-based particles 600. The fill factor percentage of this tenth example structure is approximately 77.7%, which may achieve a linear cure shrinkage of approximately 8%.

Figure 8B:
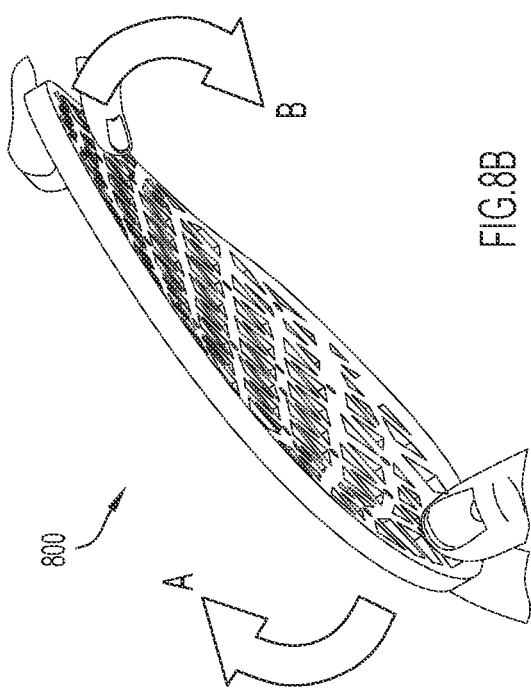
FIGS. 8A and 8B illustrate views of the ultra-low CTE structure illustrated in FIG. 1A when the ultra-low CTE structure is in the green state, and in accordance with the aspects of the present invention.
Figure 8A:
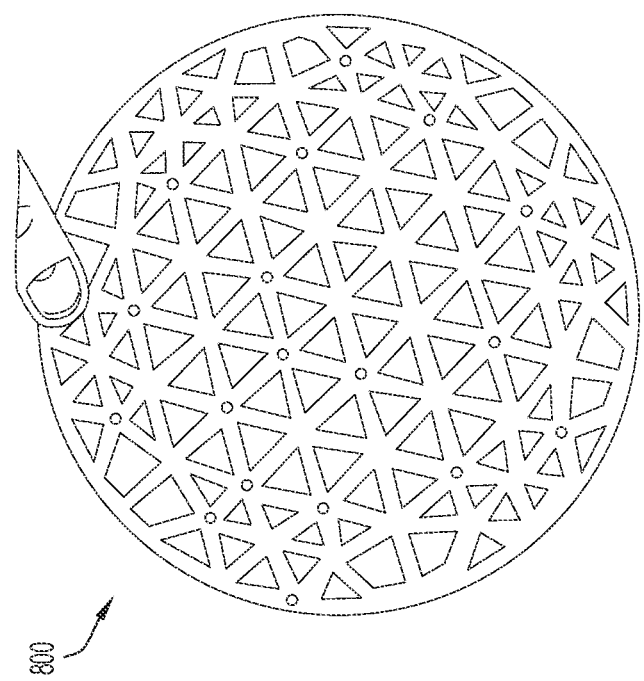

Turning to FIGS. 8A and 8B, and with continued reference to FIG. 3, illustrated is a 3D printed structure 800 in a green state after performing the 3D printing process 340 and the low temperature dry out process 350 of the additive manufacturing method 300, but prior to performing the sintering process 360 of the additive manufacturing method 300. Thus, the green state 3D printed structure 800 is the result of the 3D printing process 340 with a slurry that contains a mixture of the first set of substantially spherical silica-based particles 400, the second set of substantially spherical silica-based particles 500, a surfactant, a UV curable binder, and possibly further mixed with the third set of submicron silica-based particles 600, as previously explained. The green state 3D printed structure 800 is the further result of the dry out process 350 of the additive manufacturing method 300, where the presence of the UV curable binder in the slurry promotes further polymerization of the green state 3D printed structure 800 when subjected to UV light. By using the slurry mixture described herein, the 3D printed structure 800, or any other 3D printed structure, may have a green strength that is sufficient to enable handling of the 3D printed structure without the 3D printed structure breaking or becoming damaged. This is depicted in FIG. 8B, where the 3D printed structure 800 is subjected to opposing twisting forces A, B without the green state 3D printed structure 800 becoming damaged. As illustrated in FIG. 8A, the green state 3D printed structure 800 is a cathedral configuration.

Figure 9A:
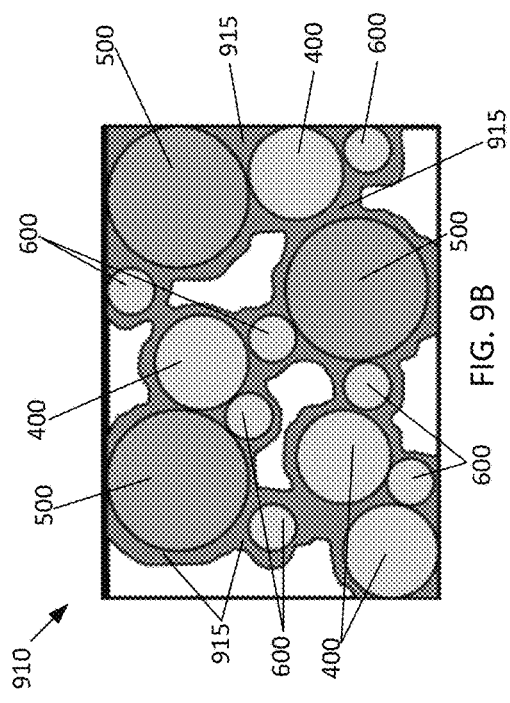
FIGS. 9A-9D illustrate schematic cross-sectional views of the particles making up a structure during different iterations of the infiltration step of the process illustrated in FIG. 3, and in accordance with the aspects of the present invention.

Turning to FIGS. 9A-9D, illustrated are a series of schematic diagrams of the particles of a 3D printed structure as they are subjected to the dry out process 350 and the infiltration process 380 of the additive manufacturing method 300. As previously explained, the 3D printed structures, after the initial dry out process of step 350 can be infiltrated with submicron particles in order to minimize the post sintering cure shrinkage of the 3D printed structure, while simultaneously strengthening the 3D printed structure. FIG. 9A illustrates block 900, which schematically depicts the structural makeup of the 3D printed structure after the 3D printing process 340 of the additive manufacturing method 300, but prior to the dry out process 350. As shown in block 900, the first set of spherical silica-based particles 400, the second set of spherical silica-based particles 500, and the third set of submicron silica-based particles 600 are submerged in a liquid polymer material 905. In other words, block 900 depicts the first, second, and third set of particles 400, 500, 600 in the slurry, but post printing of the slurry mixture.

Figure 9B:
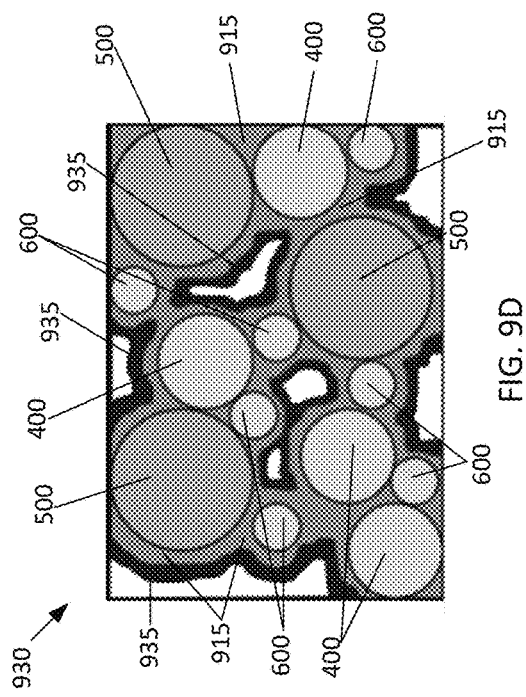

FIG. 9B illustrates block 910, which schematically depicts the structural makeup of the 3D printed structure of block 900 after being subjected to the low temperature dry out process 350. Thus, block 910 schematically illustrates the structural makeup of the 3D printed structure when in the green state. As shown in block 910, after the dry out process 350, the polymer material 905 has become pyrolyzed or cured to bond the first, second, and third sets of particles 400, 500, 600 to one another. In other words, the pyrolyzed polymer material 915 bonds the first, second, and third sets of particles 400, 500, 600 to one another to form the 3D printed structure in the green state.

Figure 9C:
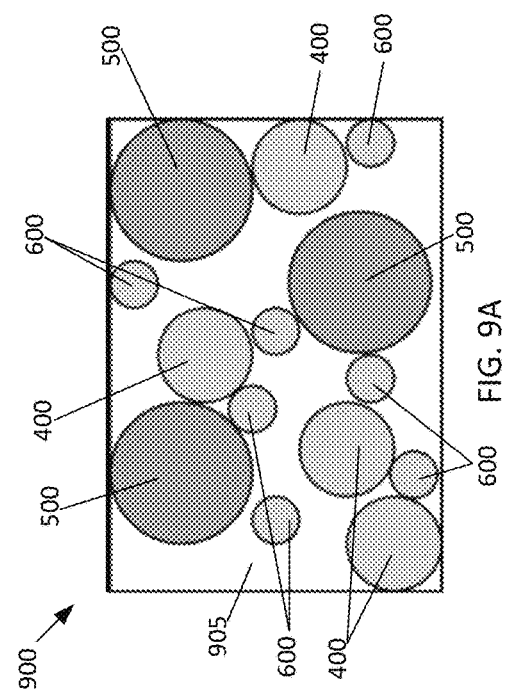

FIG. 9C illustrates block 920, which schematically depicts the structural makeup of the 3D printed structure of block 910 after being subjected to the infiltration process 380 of the additive manufacturing method 300. During the infiltration process 380, the 3D printed structure in the green state is subjected to a vacuum infiltration of sol-gel materials, such as titanium precursors (e.g., titanium isopropoxide or TTIP) and/or silicon precursors (e.g., Tetraethyl orthosilicate or TEOS), and/or vacuum infiltration of additional submicron silica-based particles. The smaller submicron particles (i.e., less than 0.20 µm) are infiltrated into the 3D printed structure in the green state to fill the intra-particle voids, or interstitial spaces between the particles, in order to increase the pre-sintering density and decrease the linear cure shrinkage of the 3D printed structure. As shown in block 920, the infiltration material 925 fills the voids or interstitial spaces between the first, second, and third sets of silica-based particles 400, 500, 600 and the pyrolyzed polymer material 915. As will be further explained below, the infiltration process 380 may be performed numerous types to increase the pre-sintering density of the 3D printed structure.

Figure 9D:
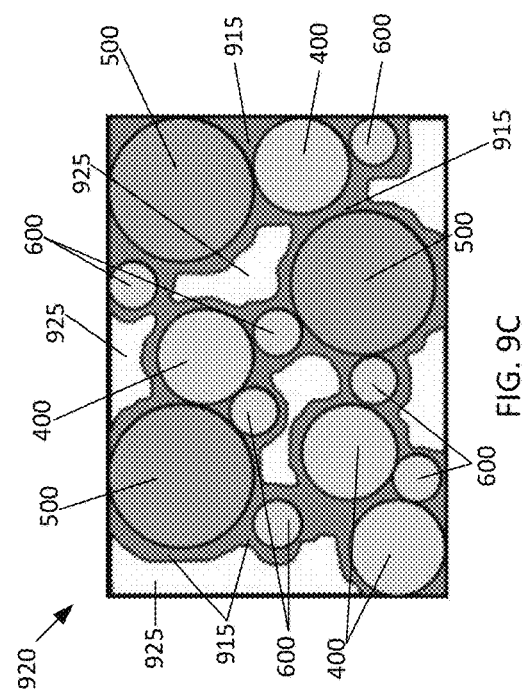

FIG. 9D illustrates block 930, which schematically depicts the structural makeup of the 3D printed structure of block 920 after being subjected to pre-sintering temperatures in order to pyrolyze the infiltration materials. As shown in block 930, the infiltration materials 925 of block 920 have been pyrolyzed into the pyrolyzed infiltration material 935, which at least partially fills some of the intra-particle voids or interstitial spaces between the silica-based particles 400, 500, 600. Thus, the pyrolyzed infiltration material 935 is added to the pyrolyzed polymer material 915 and the silica-based particles 400, 500, 600 to increase the pre-sintering density of the 3D printed structure such that it is higher than the 3D printed structure depicted in block 910. The infiltration process and pre-sintering process (blocks 920 and 930) may be performed several times before performing the sintering process 360 of the additive manufacturing method 300 in order to increase the pre-sintering density of the 3D printed part and decrease the linear cure shrinkage.

Figure 10:
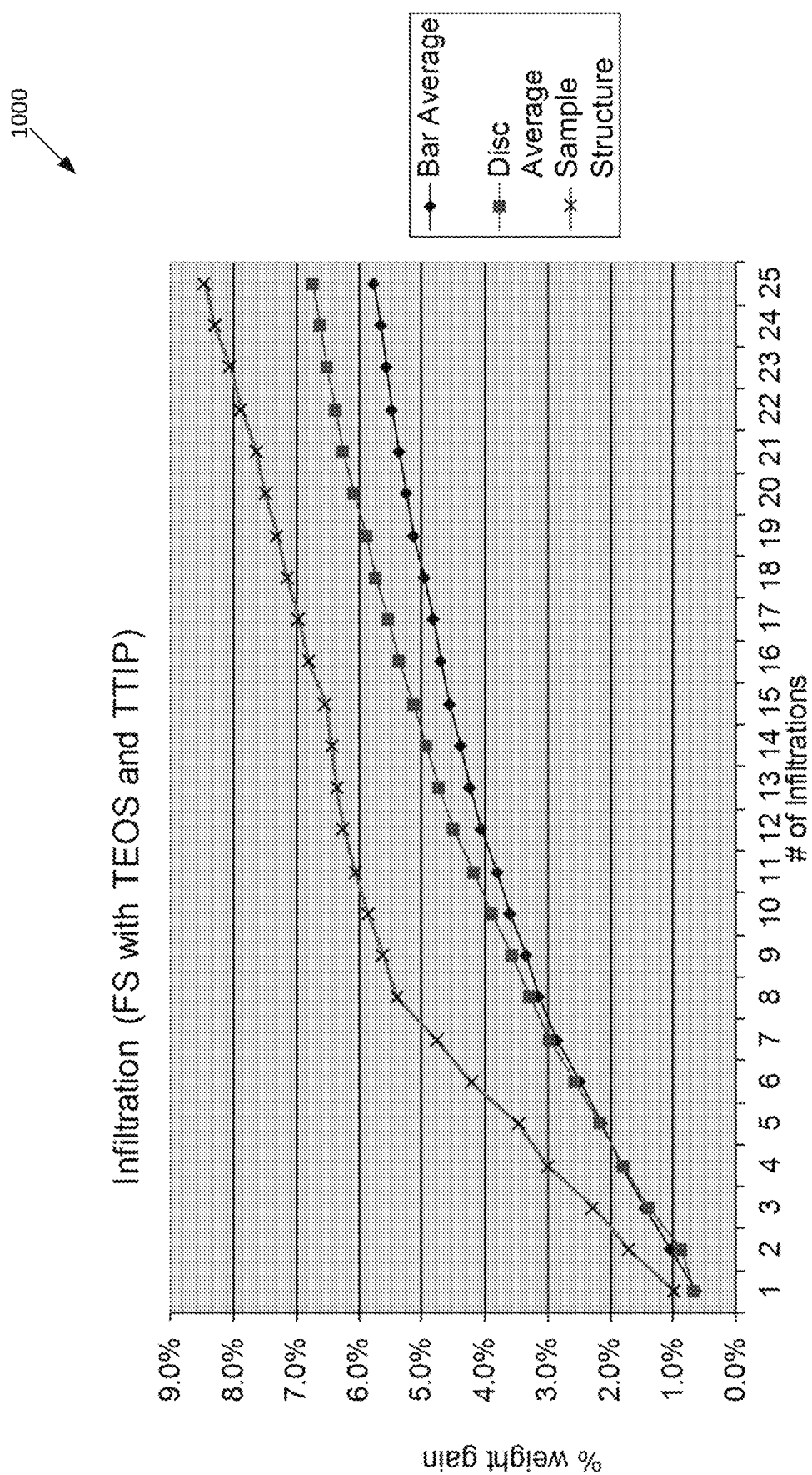
FIG. 10 illustrates a graph of the percentage of weight gain in various additively manufactured structures versus the number of times the infiltrations step is performed on each of the structures in accordance with the aspects of the present invention.

Turning to FIG. 10, illustrated is a chart 1000 which depicts the number of infiltrations for three different 3D printed structures: a 3D printed bar, a 3D printed disk, and a third 3D printed sample structure. As depicted in the chart 1000, as the number of completed infiltrations increases, the pre-sintering density of the 3D printed structures also increases. Thus, the more infiltrations performed on a 3D printed structure, the denser the 3D printed structure becomes, and the 3D printed structure is less likely to crack or become damaged during the sintering process due to the associated decrease in the linear cure shrinkage percentage. In other words, the denser the pre-sintered 3D printed structure, the more predictable the final dimensions of the final post-sintered 3D printed structure become.

Turning back to FIGS. 1A-1C, illustrated is a 3D printed low or ultra-low CTE structure 100 using the additive manufacturing method 300 illustrated in FIG. 3 and the powder and slurry mixture of the tenth example structure of FIG. 7 (i.e., 62% of the first set of spherical silica-based particles 400, 38% of the second set of spherical silica-based particles 500, and the addition of 20% of the third set of submicron silica-based particles 600). As best illustrated in FIG. 1A, the 3D printed structure 100 has a cathedral configuration. The complex interwoven and hexagon-like structure of the cathedral structure 100 shown in FIG. 1A is made possible by the additive manufacturing method 300, and is not typically possible through conventional subtractive manufacturing processes. Moreover, the cathedral structure 100 contains a greater stiffness than that of a hexagon-type/honeycomb-type structure typically created with other 3D printing methods. The interwoven bars 110 extending across the corners of each hexagon cell 120 in the cathedral structure 100 to increase the stiffness of the structure 100 while adding a minimal amount of weight to the structure 100 when compared to hexagon-type/honeycomb-type structures 200. FIG. 1B illustrates a side view of the cathedral structure 100, which shows the multiple layers 130 of the cathedral structure 100 that are a result of the 3D printing process (i.e., the deposition of layer upon layer to build the structure). FIG. 1C further illustrates an optical photomicrograph of the surface texture of the 3D printed cathedral structure 100. As shown in FIG. 1C, the surface texture of the 3D printed cathedral structure 100 shows a generally planar surface, with some surface irregularities, especially when compared to the surface of a silica-based structure constructed using subtractive manufacturing techniques. The 3D printed cathedral structure 100 shown in FIGS. 1A-1C may have had a fill factor percentage of approximately 77.7% prior to being sintered, and, thus, may have had a linear cure shrinkage of approximately 8%. In addition, the 3D printed cathedral structure 100 may have an ultra-low CTE of 0.03 ppm/° C.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A three dimensional printed structure comprising:
a first set of silica-based particles that are spherical and have a first average size, the first set of silica-based particles are a distribution of micron particles that range in size from approximately 1 micrometer to approximately 60 micrometers, and that have a density distribution of D50 equal to approximately 12 micrometers to approximately 25 micrometers, where the first average size is between approximately 14 micrometers and approximately 19 micrometers; and
a second set of silica-based particles that are of any shape and that have a second average size that is smaller than the first average size, the second set of silica-based particles are submicron particles that range in size from approximately 0.05 micrometers to approximately 1 micrometer, and that have a density distribution of D50 equal to approximately 0.1 micrometers to approximately 0.35 micrometers,
wherein the three dimensional printed structure has a coefficient of thermal expansion less than or equal to 0.03 parts per million per ° C.

2. The structure of claim 1, wherein the second average size is approximately 0.30 micrometers.

3. The structure of claim 1, wherein the first average size is at least 10 times the second average size.

4. The structure of claim 1, wherein a majority of the particles of the first set of silica-based particles are spherical.

5. The structure of claim 1, wherein the three dimensional printed structure has a pre-sintering fill factor of at least 67% and a post-sintering linear cure shrinkage less than 10%.

6. A three dimensional printed structure comprising:
a first set of silica-based particles that are spherical and have a first average size;
a second set of silica-based particles that are of any shape and that have a second average size that is smaller than the first average size; and
a third set of silica-based particles that are spherical and have a third average size that is larger than the first average size and the second average size
wherein the three dimensional printed structure has a coefficient of thermal expansion less than or equal to 0.03 parts per million per ° C.

7. The structure of claim 6, wherein the first set of silica-based particles are a distribution of micron particles that range in size from approximately 0.4 micrometers to approximately 30 micrometers, where the first average size is approximately 12 micrometers.

8. The structure of claim 7, wherein the second set of silica-based particles are a distribution of micron particles that range in size from approximately 0.04 micrometers to approximately 0.5 micrometers, where the second average size is approximately 0.3 micrometers.

9. The structure of claim 8, wherein the third set of silica-based particles are a distribution of micron particles that range in size from approximately 17 micrometers to approximately 60 micrometers, where the third average size is approximately 25 micrometers.

10. The structure of claim 1, further comprising:
a series of hexagon cells coupled to one another, each hexagon cell of the series of hexagon cells containing a plurality of corners; and a series of interwoven bars extending across the plurality of corners of each hexagon cell.

* * * * *